Feb. 16, 1954             L. J. MEYER             2,669,268

NUT SHELLER

Filed Aug. 19, 1950                                             2 Sheets-Sheet 1

INVENTOR.
Leo J. Meyer
BY Lester B. Clark
& Ray L. Smith
ATTORNEYS.

Feb. 16, 1954  L. J. MEYER  2,669,268
NUT SHELLER

Filed Aug. 19, 1950  2 Sheets-Sheet 2

INVENTOR.
Leo J. Meyer
BY Lester B Clark
& Ray L. Smith
ATTORNEYS.

Patented Feb. 16, 1954

2,669,268

UNITED STATES PATENT OFFICE 2,669,268

NUT SHELLER

Leo J. Meyer, San Antonio, Tex.

Application August 19, 1950, Serial No. 180,413

5 Claims. (Cl. 146—8)

1

The invention relates to improvements in nut shelling machines and more specifically to machines for loosening the kernels of nuts from their shells. Machines embodying the invention are of particular utility in loosening the kernel of pecans from the shells thereof.

In the pecan shelling industry there are many sizes and types of nuts to be worked upon to remove the kernel or meats from the nut shells. Such nuts vary from the very small, hard shell, seedling pecans to the largest paper shell pecans. In the past, an attempt has been made to provide machines that would successfully remove the meats from the shells. However, difficulty has been experienced in that prior machines would operate efficiently on one type of nut and fail utterly on another type of nut, either failing to shell the nut at all, or would so mangle the kernel or meat as to practically form a meal thereof.

An object of the present invention is to provide a nut shelling machine that is capable of effectively removing the kernel or meat from the shells of nuts regardless of the size or other characteristics of the nuts.

Another object is to provide a machine which will discharge both the kernel and the shell fragments as soon as they have been separated whereby unnecessary abuse of the kernel is avoided.

Still another object is to provide a machine which may be readily adjusted or modified that any type may be efficiently shelled without damage to the kernel.

It is also an object to provide a shelling machine which may be used to separate kernel or meats from the shells of nuts previously cracked or to serve as a combined nut cracker and nut sheller.

The foregoing objects together with other objects and advantages of the invention will be more fully apparent from the following description considered in connection with the accompanying drawings in which.

2

Figure 1:
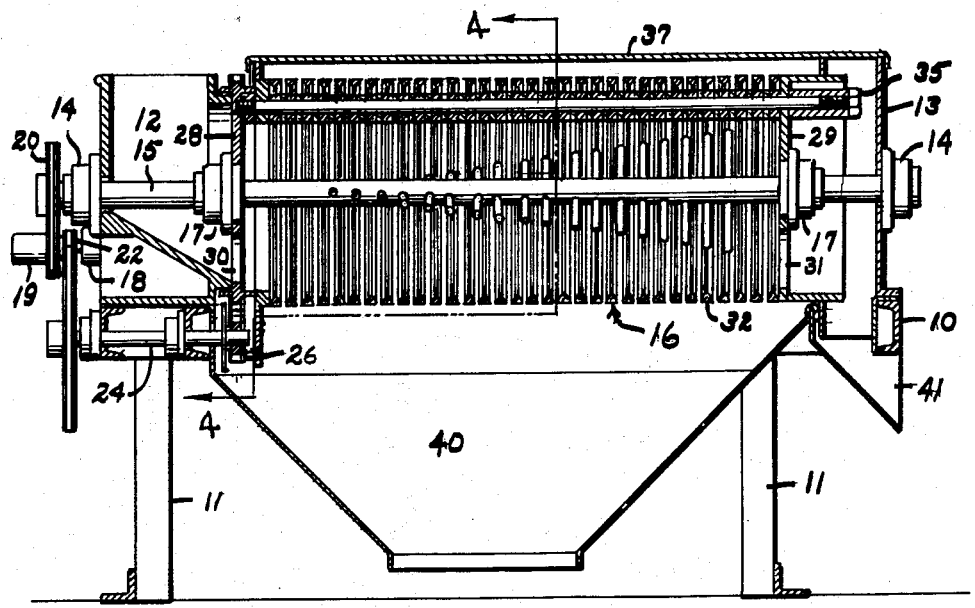
Fig. 1 is a vertical longitudinal section through a machine embodying the invention.

While reference is made herein to the invention as a pecan shelling machine, it is to be understood that the invention is not limited to the shelling of pecans and it is also to be understood that the term "shelling" comprehends the loosening of the kernel from the shell and may be performed after the nuts have been subjected to a prior shelling operation or without employing any means for breaking the shells of the nuts before they are admitted to the machine.

The disclosed embodiment of the invention comprises a base 10 surmounting legs 11 serving as a support for the superstructure comprising an inlet hopper 12 at one end and a bearing support and closure 13 at the opposite end. The hopper 12 and the plate 13 are provided with aligned bearings 14 which support the agitator shaft 15 and the composite shelling cylinder 16 mounted thereon.

Figure 2:
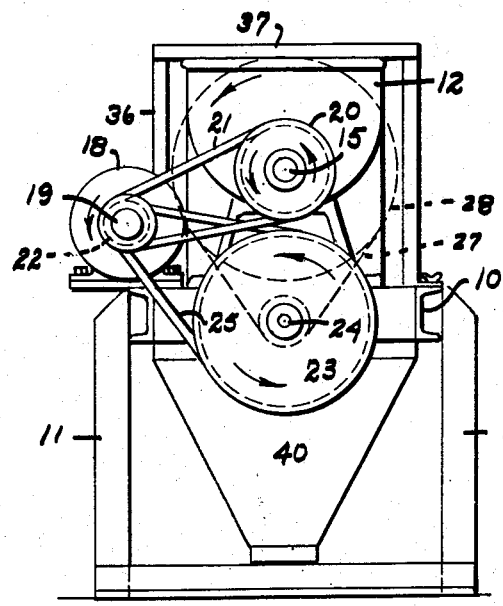
Fig. 2 is a left hand elevational view of the machine.
Figure 3:
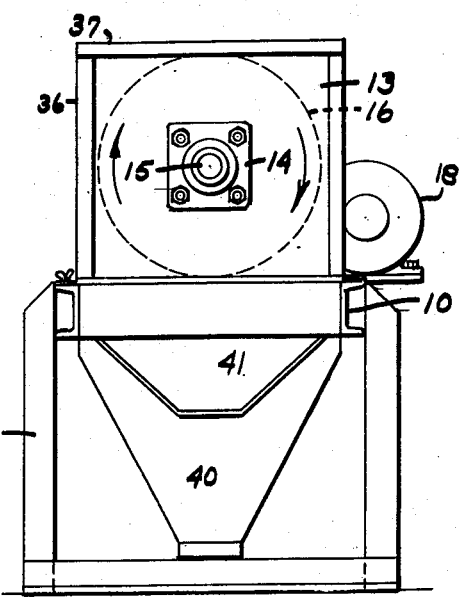
Fig. 3 is a right hand elevational view of the machine.

The shelling cylinder 16 is of special construction and is rotatably mounted upon the shaft 15 by suitable bearings 17 whereby the cylinder and shaft may rotate independently, both being driven by a suitable prime mover such as the motor 18 best seen in Fig. 2.

The shaft of the motor 18 is provided at its outer end with a variable speed V-pulley 19 which drives the pulley 20 on the shaft 15 through V-belt 21. The purpose of this particular drive connection is intended to enable flexibility in the speed of rotation of the shaft 15. For example, the pitch of the pulley 19 may be changed for a different speed and a substitute V-belt 21 of greater or less length will be provided that the desired driving connection is had.

The shaft of the motor 18 is also provided with a pulley 22 drivingly connected to the pulley 23 through V-belt 25. The pulley 23 is mounted upon the end of a counter shaft 24 which passes through bearings in the base 10 and is provided at its opposite end with a sprocket 26. This sprocket drives chain 27 which passes over the large sprocket 28 forming the end of the cylinder 16 mounted on one of the bearings 17 on the shaft 15. It thus becomes apparent that by suitable selection of ratios between the various V-pulleys, any suitable preselected relative rate of rotation between the agitator shaft 15 and the cylinder 16 may be had.

The large sprocket 28 which closes one end of the cylinder 16 is provided with a port or ports 30 through which nuts may be admitted to the interior of the cylinder 16. Similarly, the closure plate 29 at the opposite end of the cylinder is provided with one or more ports 31 whereby nuts, or parts thereof, may be discharged from the cylinder and thence from the machine via the discharge spout or reject chute 41.

Intermediate the large sprocket 28 and the plate 29 the cylinder 16 comprises a series of rings 32 and spacers 33 assembled and clamped together upon tie bolts 34, each of which has one end secured in the sprocket 28 and the other end passing through the plate 29 and provided with a nut 35 at its outer end. It seems apparent that if the end plate 13 is removed from the base 10, the bearing 17 loosened upon the shaft 15 and the nuts 35 removed from the tie bolts 34, the entire series of rings 32 and the spacers 33 may be removed without disturbing parts of the machine with the possible exception of the sides 36 and the cover 37. Thus the width of the space between successive rings 32 may be readily changed by inserting spacers 33 of selected width or widths and varying in number of rings 32 without changing the length of the cylinder 16.

Figure 4:
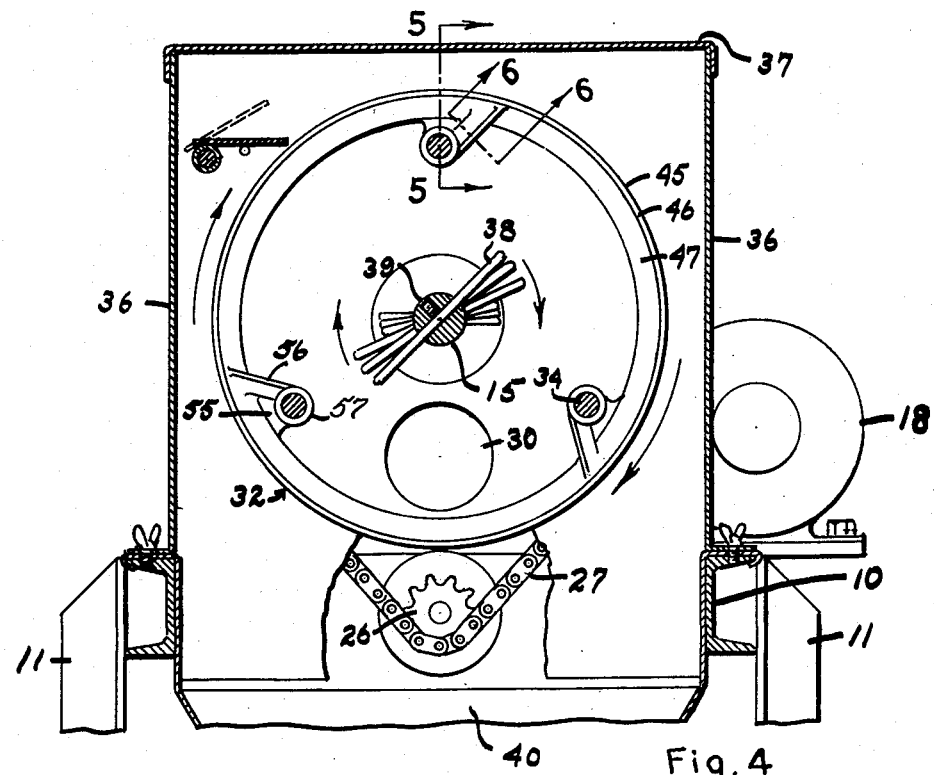
Fig. 4 is a transverse sectional view taken on line 4—4 of Fig. 1.
Figures 5, 6:
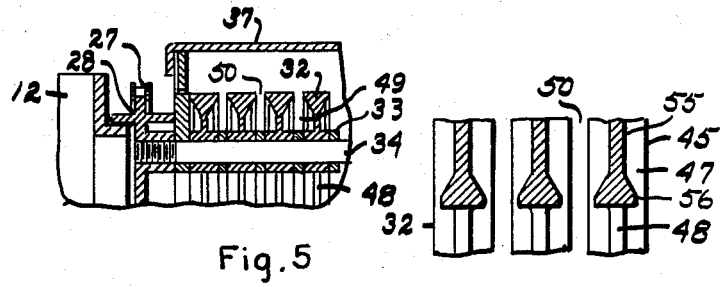
Fig. 5 is a fragmentary sectional view taken on line 5—5 of Fig. 4.
Fig. 6 is an enlarged sectional detail taken on line 6—6 in Fig. 4.

As best seen in Figs. 1 and 4, the shaft 15 is provided with a series of pins or beater bars 38. Each of these pins passes through an opening in the shaft 15 and is secured in place as by means of a set screw 39. Preferably, the pins 38 vary in length longitudinally of the machine, the shortest being spaced a short distance from the hopper end of the machine. It is also desirable that the pins be angularly staggered along the shaft preferably forming a helix which spirals rearwardly, relative to the direction of rotation, from and the entrance toward the exit end of the machine.

Attention is directed to the structure of the individual rings 32 of the cylinder 16. Each of these rings comprises an annular outer portion 45 having relatively narrow parallel side faces 46 (Fig. 4) which merge inwardly with converging surfaces 47 which in turn terminate in a relatively narrow land 48. It becomes apparent that this construction provides, with the spacer 33, outwardly converging annular pocket 49 through which nut meats and shells may pass once they have been separated. It is to be understood that spacers for a given batch of nuts will be so selected that the radial passage 50 from the pockets 49 will pass either the meats or the shell fragments, but will not pass adhering meats and shells.

At angularly spaced points on each of the rings 32, the surface 47 merges into a gusset 55 having a sloping forward flange 56. The gusset and flange are integrated with the boss 57 which has an axially extending passage to slidingly receive one of the tie bolts 34. This simple construction serves to provide adequate strength while at the same time avoiding ledges or pockets into which nuts, or parts thereof, may lodge.

The operation of the machine embodying the invention is believed apparent from the foregoing description. By way of supplement, it will be assumed that the machine is operating on nuts that have previously been run through a cracking machine. The material introduced to the hopper 12 will enter the cylinder 16 in three grades, namely, (1) loose pieces of meat and shell, (2) pieces of meat with shell adhering to them, and (3) meats which have been insufficiently cracked and therefore represent an entire unit of meat and shell. Obviously, the pieces of shell and meat which have already loosened sufficiently to come apart, should be agitated only sufficiently to effect separation. Any greater agitation would serve only to damage the meats which together with the pieces of shell are already sufficiently small to fall through the passages 50 between adjacent rings 32 and thence fall by gravity through the discharge chute 40.

Nut meats and shell still adhering will require some force to separate them. Since they will not pass through the spaces between the rings 32 they advance along the cylinder 16 until they are finally engaged by the inner pins 38. From this point, they proceed onwardly constantly engaging longer pieces until the meat is loosened from the shell and the meat and shell promptly fall through the space between the rings. Nuts which have been insufficiently cracked proceed axially of the cylinder constantly encountering more severe agitation from engagement with the longer pins 38 until they are finally broken into pieces to pass through the spaces between the rings. In event they are not broken sufficiently to pass between the rings, they eventually pass out the right end of the cylinder through the opening 31 and are discharged through the reject chute 41.

From the foregoing, it is apparent that none of the meats are subjected to more agitation than is necessary to separate them from adhering fragments of shell and, therein lies an important factor in the spacing by the rings 32. This spacing should be just sufficient to allow an undamaged nut meat or kernel, of the size being run, to fall therethrough. If the spacing is too narrow, the meat will have to be broken down before it can emerge from the cylinder. This results in an inferior product and a direct loss in volume in the portion of meats which have been reduced to meal. If the spacing between the rings is too wide, adhering meats and shell will emerge from the cylinder before the shelling operation is completed. This entails either hand labor or other expensive processes in an attempt to recover the salable meat from the shell. Thus, the spacing between the rings is always gaged from the size of the nut meat being processed.

The speed of the agitation shaft is governed by the hardness of the shell of the nut being processed. Hard shell nuts require a higher speed than do softer shell varieties. It is to be noted also that the helix angle of the pins 38 and the speed of the shaft 15 determine the rate of travel of material through the cylinder 16.

Broadly, the invention comprehends a nut shelling machine capable of separating nut meats or kernels from the shell with a minimum of destructive action upon the meats.

What is claimed is:

1. A nut sheller including, a housing a shaft journalled therein, a drum, a shaft supporting said drum with ends journalled for rotation in said housing and comprising, a plurality of spaced, separate rings, each ring including a ring having spaced apart, inwardly extending projections thereon with a boss on each projection, said bosses providing holes therein angularly spaced apart and radially spaced from the axis of said drum whereby said boss holes may be axially aligned, annular, separate, individual spacers between said bosses for holding said rings in selected spaced relation at their peripheries, and tie means extending through said holes and said spacers with ends to removably bear upon said drum ends to hold said drum ends and said rings in assembled relationship, said housing providing an inlet, said drum end adjacent said inlet providing an inlet opening therein through which nut kernels and shells placed in said inlet may pass into said drum, said housing also providing an outlet and the other end of said drum providing an outlet opening to communicate with said outlet, a bin below said drum, said shaft having spaced radially extending pins thereon successively angularly displaced to form a helix between said inlet opening and said outlet opening and being progressively longer from said inlet opening to said outlet opening to provide progressively increased beating action on the nut kernels and shells passing through said drum toward said outlet, each of said rings comprising annular outer means and a smaller diametrically dimensioned annular inner portion whereby annular feed pockets are formed to conduct a substantial part of said nut kernels and shells in a sifting action to the peripheral spaces between said outer portions to fall therethrough into said bin, each projection including a web for connecting the boss thereon to said rim, said webs having one side thereof which extends from the rim to the bolt receiving portion at a substantial angle to a radial line from said drum axis to the point of connection of said side to said rim so that said bosses abet the shifting action of the drum in feeding through the feed pockets and discharging through the spaces between said rings and avoid lodgment pockets at said bosses.

2. A barrel tumble comprising, a series of rings, a plurality of individual means to selectively axially space said rings apart in accordance with a multiplicity of pre-determined spacing patterns, each ring having a flat peripheral rim surface which combines with the peripheral surfaces of other rings to form a smooth cylindrical outer barrel face, said ring being of greatest axial width at its peripheral rim and having its side faces converging radially inwardly for cooperation with side faces of adjoining rings to provide feed troughs leading to annularly uninterrupted discharge openings between the spaced rims, bolt receiving means including internal anchor bosses rising inwardly from the rings to receive through bolts which locate the rings, said bolt receiving means including said inwardly rising bosses which have a forward edge which slopes backwardly from the rim from a point in advance of the boss to deflect material being tumbled and avoid lodgment pockets at the bosses.

3. A barrel tumble comprising, a series of axially spaced rings, each having a flat peripheral rim surface which combines with the peripheral surfaces of other rings to form a smooth cylindrical outer barrel face, said ring being of greatest axial width at its peripheral rim and having its side faces converging radially inwardly for co-operation with side faces of adjoining rings to provide feed troughs leading to annularly uninterrupted discharge openings between the spaced rims, internal anchor bosses rising inwardly from the rings to receive through bolts which locate the rings, said bosses including webs for connecting the bolt receiving portion to the rim, said webs having one side thereof which extends from the rim to the bolt receiving portion at a substantial angle to a radial line from the tumble axis to the point of connection of said side to said rim so that said bosses abet the sifting action of the drum in feeding through the feed troughs and discharge openings and avoid lodgment pockets at the bosses, said tumble including through bolt receiving spacers separately installable between said bosses to selectively, axially space said rings apart to determine the width of said discharge openings as measured between adjacent rims.

4. A barrel tumble comprising, a series of axially spaced rings, each having a flat peripheral rim surface which combines with the peripheral surfaces of other rings to form a smooth cylindrical outer barrel face, said ring being of greatest axial width at its peripheral rim and having its side faces converging radially inwardly for co-operation with side faces of adjoining rings to provide feed troughs leading to annularly uninterrupted discharge openings between the spaced rims, internal anchor bosses rising inwardly from the rings to receive through bolts which locate the rings, said bosses including webs for connecting the bolt receiving portion to the rim, said webs having one side thereof which extends from the rim to the bolt receiving portion at a substantial angle to a radial line from the tumble axis to the point of connection of said side to said rim so that said bosses abet the sifting action of the drum in feeding through the feed troughs and discharge openings and avoid lodgment pockets at the bosses, said tumble including through tie bolts coactive with said rings and separate, individual, selective spacing elements of varying widths to provide easily adjustable variations in the axial spacing between rings as measured between adjacent rings.

5. A tumble including a series of coaxially mounted rings, each including flat peripheral surfaces which combine with the peripheral surfaces of other rings to form an outer barrel face, said ring being of greatest axial width at its peripheral rim and having its side faces converging radially inwardly for co-operation with side faces of adjoining rings to provide feed troughs leading to annularly uninterrupted discharge openings between the spaced rims, mounting projections carried by the rings and terminated in apertured bosses, through rods passing axially through said bosses and separately formed, individual spacers of varying widths selectively mounted on the rods between selective bosses to maintain said rings axially spaced apart in easily adjustable given relation.

LEO J. MEYER.

References Cited in the file of this patent

UNITED STATES PATENTS

| Number | Name | Date |
|---|---|---|
| 17,505 | Hersey et al. | June 9, 1857 |
| 176,142 | Little | Apr. 18, 1876 |
| 311,494 | Johnson | Feb. 3, 1885 |
| 655,927 | Clark | Mar. 10, 1896 |
| 612,744 | Methven | Oct. 18, 1898 |
| 613,867 | Read | Nov. 9, 1898 |
| 855,981 | Rich | June 4, 1907 |
| 1,024,832 | Cox | Apr. 30, 1912 |
| 2,298,497 | Meyer | Oct. 13, 1942 |